(12) United States Patent
Jeon et al.

(10) Patent No.: US 8,059,545 B2
(45) Date of Patent: Nov. 15, 2011

(54) HANDOVER APPARATUS AND METHOD USING RELAY NODE IN CELLULAR SYSTEM

(75) Inventors: Young-Hyun Jeon, Guri-si (KR); Jong-Hyung Kwun, Seongnam-si (KR); Sung-Hyun Cho, Suwon-si (KR); Sanghoon Lee, Seoul (KR); Sungho Jeon, Busan (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 1074 days.

(21) Appl. No.: 11/867,457

(22) Filed: Oct. 4, 2007

(65) Prior Publication Data

US 2008/0085709 A1 Apr. 10, 2008

(30) Foreign Application Priority Data

Oct. 4, 2006 (KR) .................... 10-2006-0097530

(51) Int. Cl.
*H04J 1/16* (2006.01)

(52) U.S. Cl. ........................................... 370/236

(58) Field of Classification Search .................. None
See application file for complete search history.

(56) References Cited

U.S. PATENT DOCUMENTS

| 2004/0029600 | A1* | 2/2004 | Johnson et al. | 455/500 |
| 2006/0007888 | A1 | 1/2006 | Lee et al. | |
| 2007/0121521 | A1* | 5/2007 | D'Amico et al. | 370/252 |
| 2007/0249347 | A1* | 10/2007 | Saifullah et al. | 455/436 |
| 2007/0280172 | A1* | 12/2007 | Tan et al. | 370/335 |

FOREIGN PATENT DOCUMENTS

KR 1020070061253 6/2007

\* cited by examiner

*Primary Examiner* — Raj Jain
(74) *Attorney, Agent, or Firm* — The Farrell Law Firm, P.C.

(57) ABSTRACT

Handover apparatus and method using a Relay Node (RN) in a cellular system are provided. The handover method includes receiving, at an RN, broadcast control information of a serving Base Station (BS) and a neighbor BS; network-encoding and broadcasting, at the RN, the received broadcast control information; receiving and storing, at a Mobile Station (MS), the broadcast control information of the serving BS; receiving, at the MS, the network-encoded information from the RN when the MS enters a cell overlapping area; and acquiring, at the MS, the broadcast control information of the neighbor BS by decoding the received network-encoded information with the broadcast control information of the serving BS.

23 Claims, 9 Drawing Sheets

HANDOVER APPARATUS AND METHOD USING RELAY NODE IN CELLULAR SYSTEM

PRIORITY

This application claims priority under 35 U.S.C. §119(a) to an application filed in the Korean Intellectual Property Office on Oct. 4, 2006 and assigned Serial No. 2006-0097530, the contents of which are herein incorporated by reference.

BACKGROUND OF THE INVENTION

1. Field of the Invention

The present invention relates generally to a handover apparatus and method in a mobile communication system, and in particular, to a handover apparatus and method using a relay node in a relay-based system.

2. Description of the Related Art

In general, communication systems have been developed based on voice service and are advancing to data service and various multimedia service beyond the voice service. The voice-oriented communication systems are not satisfying users' increasing service demands because of a relatively small transmission bandwidth and expensive fees. Additionally, the advance of the communication industry and the users' increasing demand for Internet service raise necessity for communication systems capable of efficiently providing Internet service. To respond to this, a broadband wireless access system has been developed to efficiently provide Internet service with the bandwith wide enough to meet the user's increasing demands.

The broadband wireless access system utilizes an Orthogonal Frequency Division Multiplexing (OFDM)/Orthogonal Frequency Division Multiple Access (OFDMA) scheme for a physical channel. In other words, using the OFDM/OFDMA scheme, the broadband wireless access system enables high-speed data transfer by transmitting a physical channel signal using a plurality of subcarriers. Hence, the broadband wireless access system is suggested as the strong candidate for the Fourth Generation (4G) wireless communication system.

Meanwhile, a cellular mobile communication system uses handover to provide seamless service to a terminal. When the traveling terminal migrates from an initial Base Station (BS) coverage (cell area) to an adjacent BS coverage, the connection established between the former BS and the terminal is handed over to a new BS.

Now, handover in an IEEE 802.16 system, which is one of the broadband wireless access systems, is described.

To support handover of the terminal, the BS broadcasts information relating to neighbor BSs using a Mobile Neighbor Advertisement (MOB_NBR_ADV) message. The MOB_NBR_ADV message includes a plurality of Information Elements (IEs) including a Frequency Assignment (FA) index, which is an identifier and a physical channel number of the individual neighbor BS. The terminal performs the scanning using the information of the MOB_NBR_ADV message broadcast by the BS and selects a target BS to be handed over according to the scanning result. Upon selecting the target BS, the terminal acquires the synchronization by receiving a preamble of the target node, acquires information required for the network reentry procedure by receiving control information messages (e.g., DownLink-Mobile Application Part (DL-MAP), UpLink-Mobile Application Part (UL-MAP), Downlink Channel Descriptor (DCD), Uplink Channel Descriptor (UCD), etc.) of the target node, and then performs normal communication after finishing the network reentry procedure.

However, in the handover, a terminal on the cell edge cannot normally receive information from the BS because of signal attenuation caused by the distance to the BS, i.e., the terminal on the cell edge needs to receive the information of the target BS as well as the information of the serving BS to execute the handover. However, the terminal cannot receive the control information message because of the distance to the BS. In the worst case, handover failure may cause service interruption.

As for the broadband wireless access system operating in a high frequency area, its transmitting rate and the service coverage are limited due to high path loss. To address those problems, a multi-hop signal transfer scheme has recently come under development. The multi-hop technique enables the high speed data communication with the reduced the path loss by relaying data using a Relay Node (RN), and the service coverage expansion by transmitting a signal to a Mobile Station (MS) far away from the BS.

Accordingly, using the relay technique, the RN can forward the control information message from the BS to the MS without loss. Currently, a handover optimization technology for optimizing time and resource required for the handover is under consideration. If the MS acquires the control information of the target BS required for the handover procedure in advance before the MS migrates to the target BS, the handover optimization can be achieved. In other words, when the RN is used for the handover, a new method for optimizing the handover is needed.

SUMMARY OF THE INVENTION

An aspect of the present invention is to substantially solve at least the above problems and/or disadvantages and to provide at least the advantages below. Accordingly, an aspect of the present invention is to provide an apparatus and method for performing handover using an RN in a cellular system.

Another aspect of the present invention is to provide an apparatus and method for seamlessly forwarding control information of neighbor BSs to an MS on a cell edge in a cellular system.

A further aspect of the present invention is to provide an apparatus and method for network-encoding and broadcasting control information of neighbor BSs in a cellular system.

A further aspect of the present invention is to provide an apparatus and method for a handed MS to acquire control information of a target BS in advance in a cellular system.

The above aspects are achieved by providing an RN in a cellular system which includes a receiver for receiving broadcast control information of neighbor BSs; an encoder for network-encoding the received broadcast control information; and a transmitter for broadcasting the network-encoded information.

According to one aspect of the present invention, an MS in a cellular system includes a storage for storing broadcast control information of a serving BS; a receiver for receiving network-encoded information broadcast by an RN; and a decoder for acquiring broadcast control information of a neighbor BS by decoding the network-encoded information received at the receiver using the broadcast control information of the serving BS.

According to another aspect of the present invention, a handover apparatus in a cellular system includes an RN for receiving broadcast control information of a serving BS and a neighbor BS, network-encoding and broadcasting the received broadcast control information; and an MS for storing the broadcast control information received from the serving BS and acquiring broadcast control information of the neighbor BS by decoding the network-encoded information received from the RN with the broadcast control information of the serving BS.

According to a further aspect of the present invention, a communication method of an RN in a cellular system includes receiving broadcast control information of neighbor BSs; network-encoding the received broadcast control information; and broadcasting the network-encoded information.

According to a further aspect of the present invention, a communication method of an MS in a cellular system includes receiving and storing broadcast control information from a serving BS; receiving network-encoded information broadcast by an RN when the MS enters a cell overlapping area; and acquiring broadcast control information of a neighbor BS by decoding the network-encoded information using the broadcast control information of the serving BS.

According to a further aspect of the present invention, a handover method in a cellular system includes receiving, at an RN, broadcast control information of a serving BS and a neighbor BS; network-encoding and broadcasting, at the RN, the received broadcast control information; receiving and storing, at an MS, the broadcast control information of the serving BS; receiving, at the MS, the network-encoded information from the RN when the MS enters a cell overlapping area; and acquiring, at the MS, the broadcast control information of the neighbor BS by decoding the received network-encoded information with the broadcast control information of the serving BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method for using a Relay Node (RN) for handover in a cellular system.

In general, a Mobile Station (MS) acquires information of neighbor Base Stations (BSs) from a Mobile Neighbor Advertisement (MOB_NBR_ADV) message periodically broadcast by a serving BS. The serving BS provides the MS with a physical layer (PHY) profile and service type serviceable by the neighbor BSs using the MOB_NBR_ADV message so that the MS can select a handover target BS by referring to them. After deciding to perform handover, the MS migrates to the target BS, acquires information required for the network reentry procedure by receiving control information messages (e.g., DL-MAP, UL-MAP, DCD, UCD, and so on) broadcast by the target BS, finishes the network reentry procedure, and then performs the normal data communication. Particularly, the Downlink Channel Descriptor (DCD) message and the Uplink Channel Descriptor (UCD) message include DL and UL channel characteristic information required for the substantial communications. The MS receives the DCD message and the UCD message to access to the target BS.

The following description explains a method for increasing a reception efficiency of the MS using a Relay Node (RN) in a cell overlapping area when two BSs and the MS exchange information. Also, a method for reducing a signaling procedure with the target BS by acquiring control information of the target BS from the RN in advance before the MS is handed over is described. Further, a method for applying a network-encoding scheme to efficiently use radio resource when the RN transmits control information of two BSs to the MS is explained.

While a broadcast wireless access communication system is illustrated as an example, the present invention is applicable to any cellular communication system.

Figure 1:
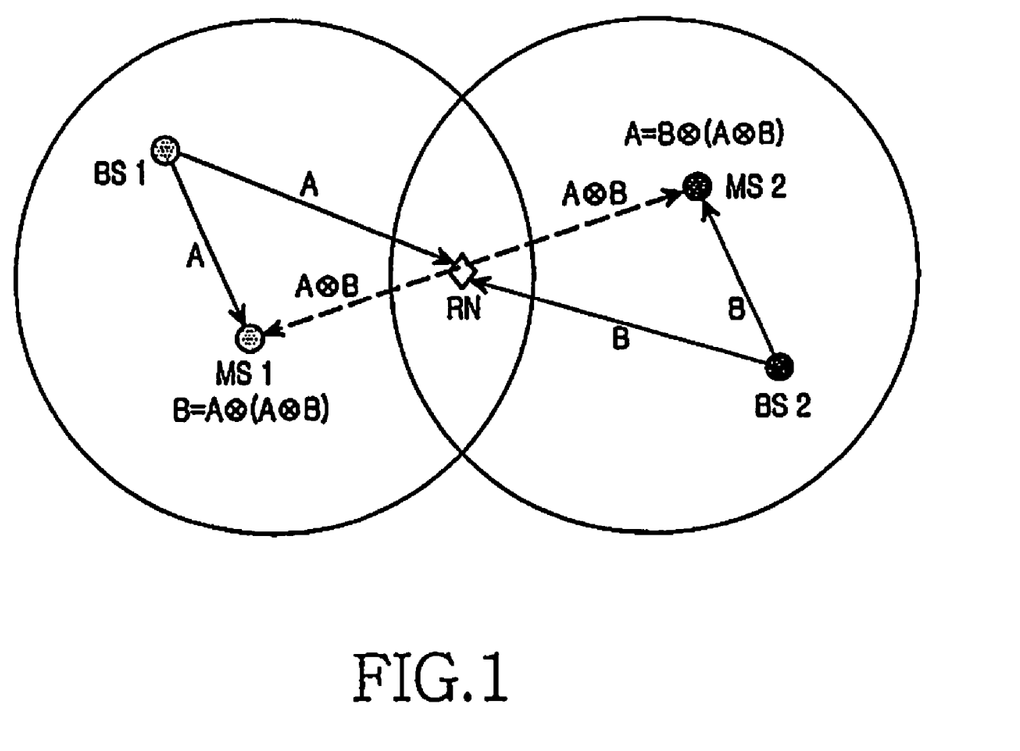
FIG. 1 is a simplified diagram of a system model according to the present invention.

FIG. 1 is a simplified diagram of a system model according to the present invention.

As indicated shown in FIG. 1, it is assumed that two cells are adjacent. BS 1, which manages a first cell, is communicating with an MS 1. BS 2, which manages a second cell, is communicating with an MS 2. The MS 1, which belongs to a cell coverage area of the BS 1, receives and stores a control information message (e.g., UCD/DCD message) broadcast from the BS 1. The MS 2, which belongs to a cell coverage area of the BS 2, receives and stores a control information message broadcast from the BS 2.

The RN, which is positioned in the overlapping area of the service coverage area of the BS 1 and the service coverage area of the BS 2, receives the control information messages broadcast from the BS 1 and the BS 2, network-encodes and broadcasts the control information of the messages.

Hereafter, it is assumed that the MS 1 is handed over to the cell of the BS 2. When the MS 1 comes to the cell overlapping area out of the service coverage of the BS 1, the MS 1 receives network-encoding information broadcast by the RN. The network encoding information is the exclusive OR (XOR) of the control information A of the BS 1 and the control information B of the BS 2. Accordingly, the MS 1 acquires the control information B of the BS 2 by decoding the network encoding information with the pre-stored control information A of the BS 1. Using the acquired control information, the MS 1 attempts to access the target BS, i.e., the signaling procedure with the target BS can be reduced by acquiring the control information required for the handover with the target BS in advance.

Figure 2:
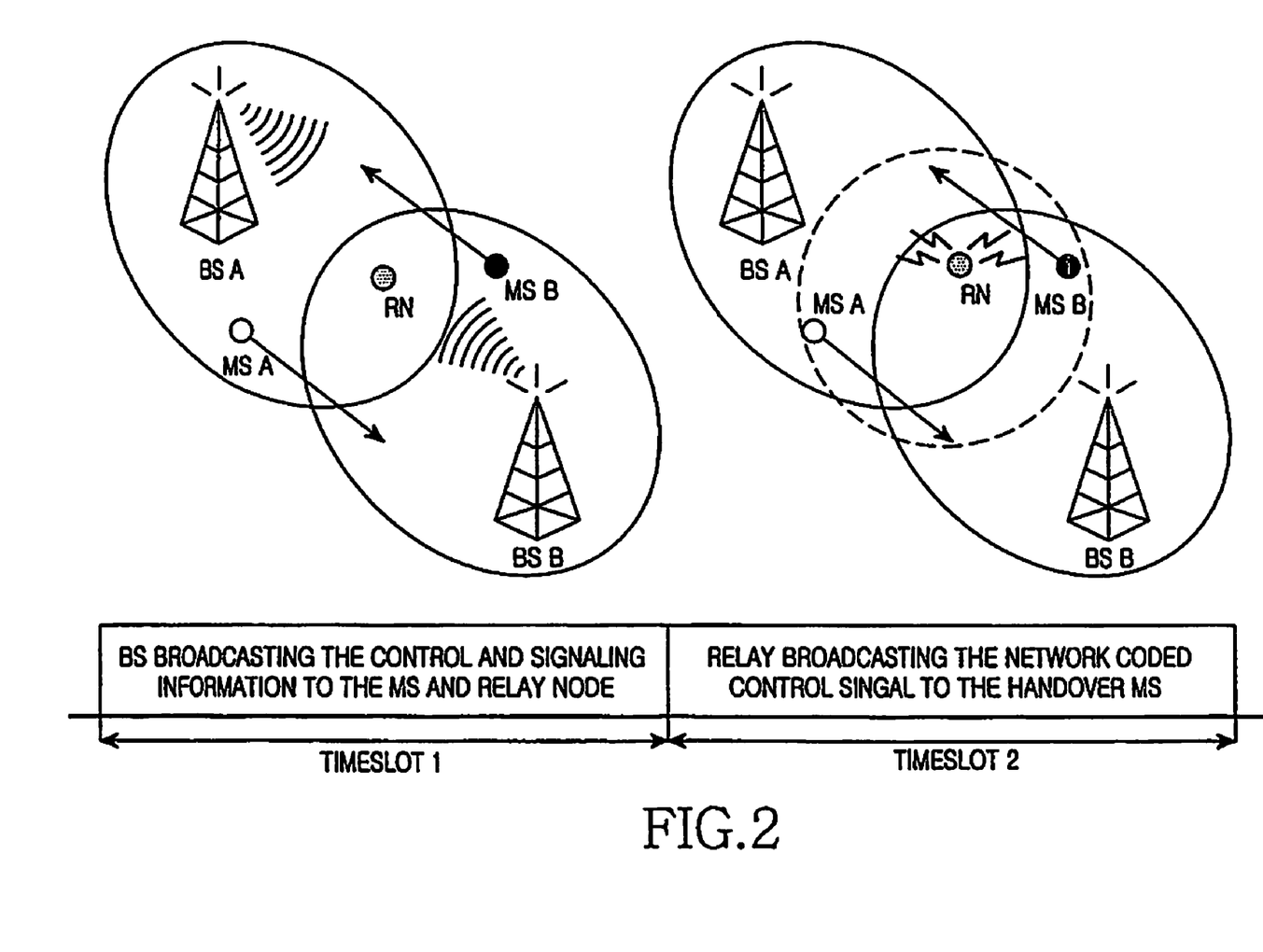
FIG. 2 is a diagram of a signaling process of an RN in a cellular system according to the present invention.

FIG. 2 is a diagram of a signaling process of an RN in a cellular system according to the present invention.

As shown in FIG. 2, the RN receives and network-encodes control information broadcast by two neighbor BSs A and B in the first step. Next, the RN broadcasts the network-encoded information over its coverage in the second step. The first step and the second step can be distinguished by the time slot or by the frequency band. The RN may receive the control information of the two BSs in the same time slot or in the different time slots. The communication between the two BSs and the RN is based on a prescribed frame structure. According to the present invention, it is assumed that the RN receives the control information of both neighbor BSs.

Figure 3:
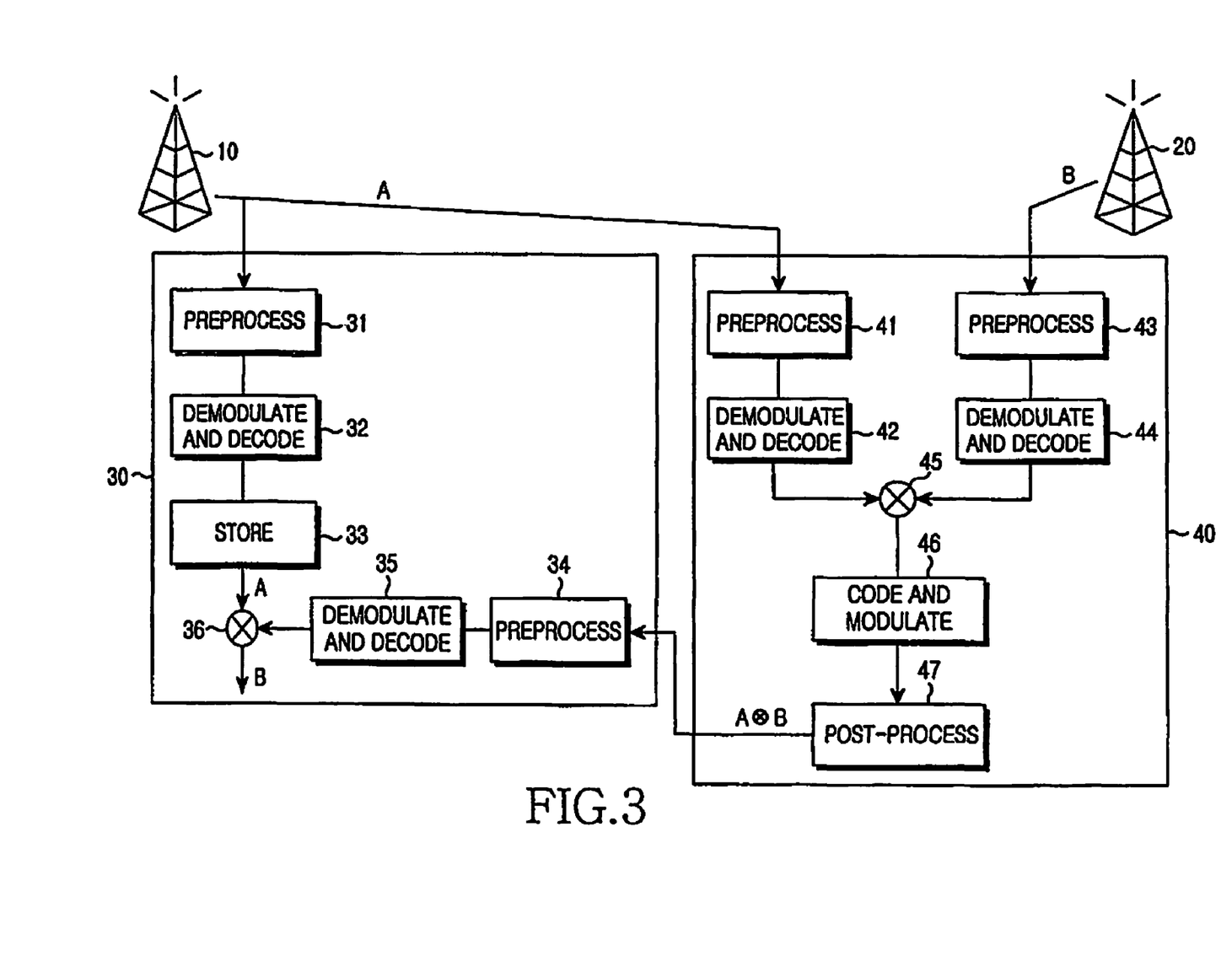
FIG. 3 is a diagram of network encoding according to the present invention.

FIG. 3 is a diagram of the network-encoding concept according to the present invention.

In FIG. 3, it is assumed that control information broadcast by a first BS 10 is 'A' and control information broadcast by a second BS 20 is 'B'. When an MS 30 travels in a service coverage area of the first BS 10, it preprocesses and converts a signal received from the first BS 10 to baseband data in step 31. Next, the MS 30 restores the control information A by demodulating and decoding the baseband data in step 32, and stores the restored control information A to its memory in step 33.

In the mean time, an RN, which is positioned in the overlapping area of the service coverage of the first BS 10 and the service coverage of the second BS 20, receives broadcast signals from both of the first BS 10 and the second BS 20. Specifically, the RN 40 preprocesses and converts the signal received from the first BS 10 to baseband data in step 41, and restores the control information A by demodulating and decoding the baseband data in step 42. The RN 40 preprocesses and converts the signal received from the second BS 20 to baseband data in step 43, and restores the control information B by demodulating and decoding the baseband data in step 44.

As indicated above, upon receiving the broadcast control information from both of the two BSs, the RN 40 network-encodes the control information A and the control information B in step 45. Next, the RN 40 encodes and modulates the network-encoded information in step 46, post-processes the information in step 47, and then broadcasts the information.

When the MS 30 moves to the cell overlapping area, it can receive information broadcast by the RN 40. Thus, the MS 30 preprocesses and converts the signal received from the RN 40 to baseband data in step 34 and restores the network-encoded information A⊗B by demodulating and decoding the baseband data in step 35. In step 36, the MS 30 acquires the control information B of the second BS 20 by network-decoding the network-encoded information with the pre-stored control information A of the first BS 10. The MS 30 utilizes the acquired control information B of the second BS 20 to access the second BS 20 after the handover.

Figure 4:
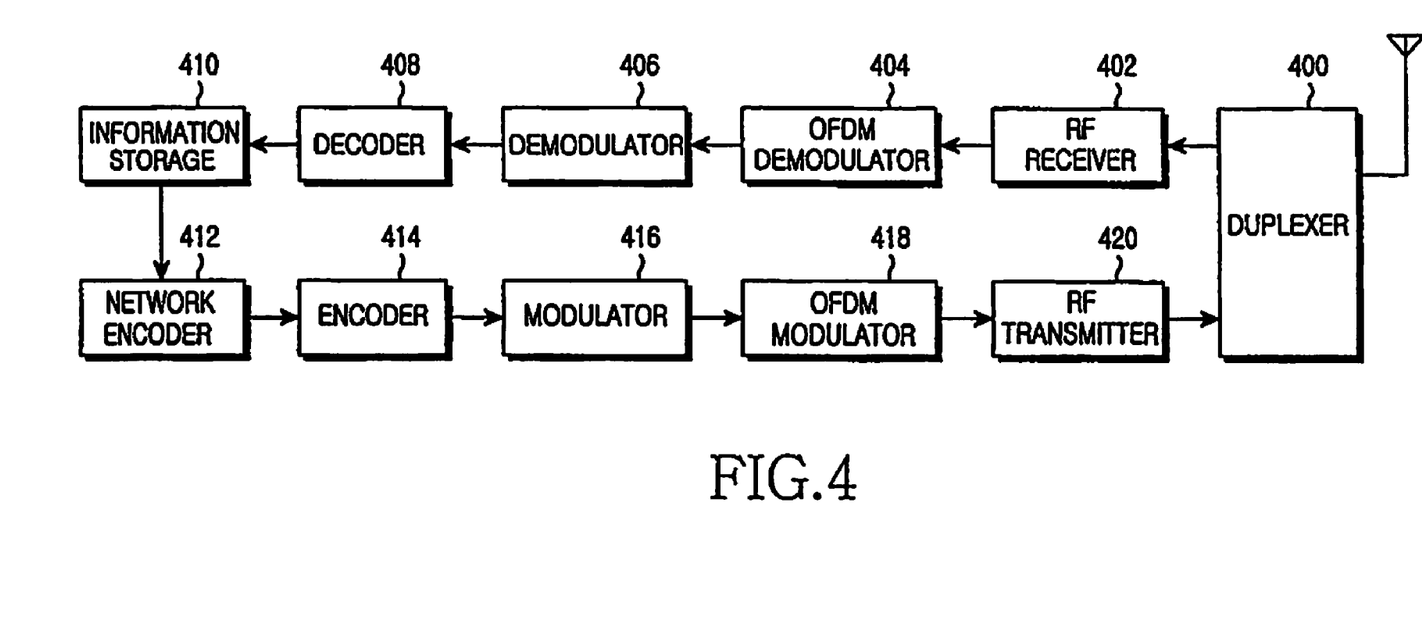
FIG. 4 is a block diagram of the RN in the cellular system according to the present invention.

FIG. 4 is a block diagram of the RN in the cellular system according to the present invention.

The RN of FIG. 4 includes a duplexer 400, an RF receiver 402, an OFDM demodulator 404, a demodulator 406, a decoder 408, an information storage 410, a network encoder 412, an encoder 414, a modulator 416, an OFDM modulator 418, and an RF transmitter 420. In the following description, a Time Division Duplexing (TDD)-OFDMA system is illustrated as an example. Note that the present invention is applicable to a Frequency Division Duplexing (FDD)-OFDMA system and a hybrid system using both TDD and FDD, regardless of the duplex scheme.

In FIG. 4, the duplexer 400 provides a receive signal from an antenna to the RF receiver 402 and provides a transmit signal from the RF transmitter 420 to the antenna according to the duplex scheme. The RF receiver 402 includes components such as a mixer, a local oscillator, and a filter. The RF receiver 402 converts the RF signal received over the antenna to a baseband signal and converts the baseband analog signal to digital sample data.

The OFDM demodulator 404 OFDM-demodulates the signal from the RF receiver 402 and outputs the frequency-domain data. Herein, the OFDM demodulation includes Cyclic Prefix (CP) elimination and Fast Fourier Transform (FFT) operation.

The demodulator 406 extracts data of the first BS and data of the second BS from the frequency-domain data fed from the OFDM demodulator 404 and demodulates the extracted data according to a preset scheme. As shown in FIG. 1, it is assumed that the RN receives signals from both of the two neighbor BSs at the same time. The decoder 408 restores the control information A and B of the two neighbor BSs by decoding the data fed from the demodulator 406 using a preset scheme.

The information storage 410 stores the control information of the first and second BSs provided from the decoder 408, and provides the stored control information of the two BSs to the network encoder 412 at a specific time.

The network encoder 412 network-encodes the control information A of the first BS and the control information B of the second BS from the information storage 410. In doing so, the network encoding scheme can employ an exclusive OR (XOR) operation. Herein, the size of the control informations A and B may differ. In this case, the XOR can be executed by padding a required number of zeros to the control information of the smaller size.

The encoder 414 channel-encodes the network-encoded information fed from the network encoder 412 using a preset scheme. For example, the encoder 414 can be a convolutional encoder, a Low Density Parity Check (LDPC) encoder, and a Convolutional Turbo Code (CTC) encoder.

The modulator 416 modulates the channel-encoded data fed from and encoder 414 using a preset scheme. For example, the modulator 416 can adopt a modulation scheme such as Quadrature Phase Shift Keying (QPSK), 16 Quadrature Amplitude Modulation (QAM), and 32 QAM.

The OFDM modulator 418 generates time-domain sample data by OFDM-modulating the data fed from the modulator 416. Herein, the OFDM modulation includes Inverse FFT (IFFT) operation and CP insertion.

The RF transmitter 420 converts the sample data fed from the OFDM modulator 418 to an analog signal, converts the baseband analog signal to and RF signal, and outputs the RF signal to the antenna via the duplexer 400.

As such, the RN receives the control information broadcast by the neighbor BSs, network-encodes and broadcasts the received control information. The network-encoded information can be any control information broadcast by the BS. For example, the network-encoded information may be UCD/DCD information required for the MS network reentry.

Figure 5:
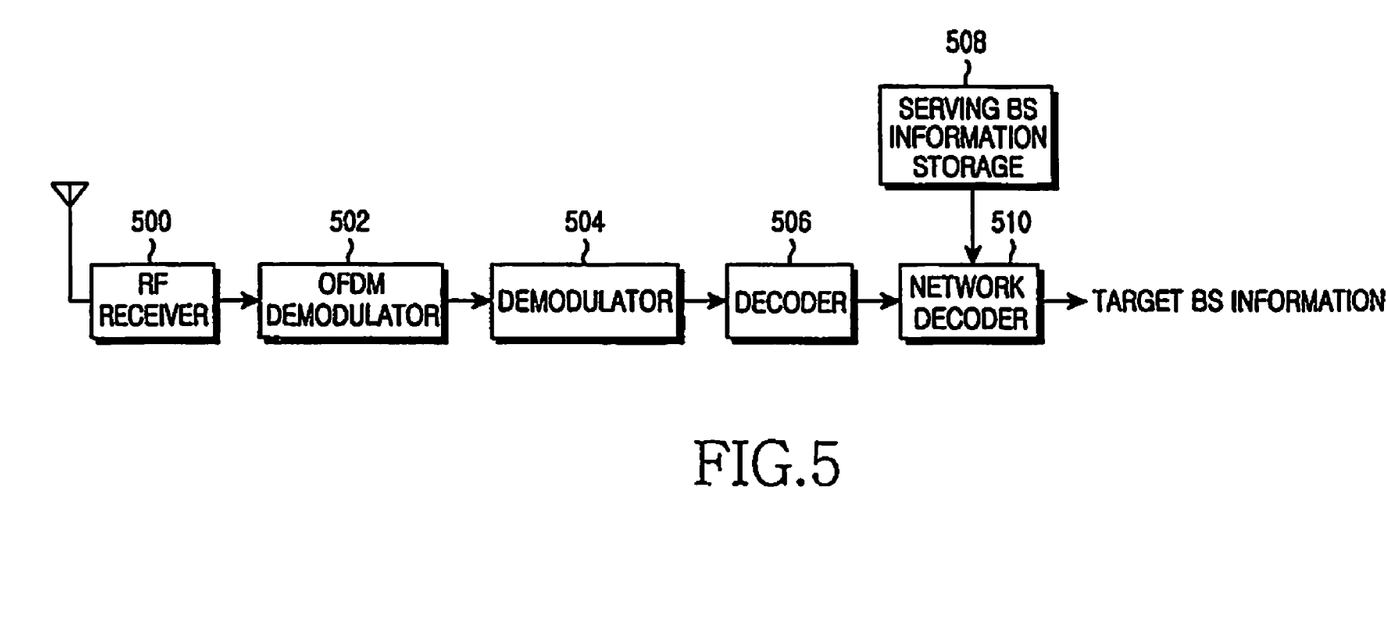
FIG. 5 is a block diagram of the MS in the cellular system according to the present invention.

FIG. 5 is a block diagram of the MS in the cellular system according to the present invention.

Components relevant to the present invention are depicted in FIG. 5. The MS includes an RF receiver 500, an OFDM demodulator 502, a demodulator 504, a decoder 506, a serving BS information storage 508, and a network decoder 510.

The serving BS information storage 508 of FIG. 5 stores control information A received from a serving BS. When the MS gets out of the service coverage area of the serving BS and moves into the cell overlapping area, the MS can receive the broadcast signal of the RN.

The RF receiver 500 converts the RF signal received over an antenna to a baseband signal and converts the baseband analog signal to digital sample data. The OFDM demodulator 502 outputs frequency-domain data by OFDM-demodulating the signal fed from the RF receiver 500. Herein, the OFDM demodulation includes CP elimination and FFT operation.

The demodulator 504 extracts data of the RN from the frequency-domain data fed from the OFDM demodulator 502 and demodulates the extracted data using a preset scheme. The decoder 506 restores the network-encoded information by channel-decoding the data fed from the demodulator 504 using a preset scheme.

The network decoder 510 restores the control information B of the target BS by network-decoding the network-encoded information A⊗B with the known control information A of the serving BS. The acquired control information of the target BS can be used when or after the MS is handed over to the target BS.

Figure 6:
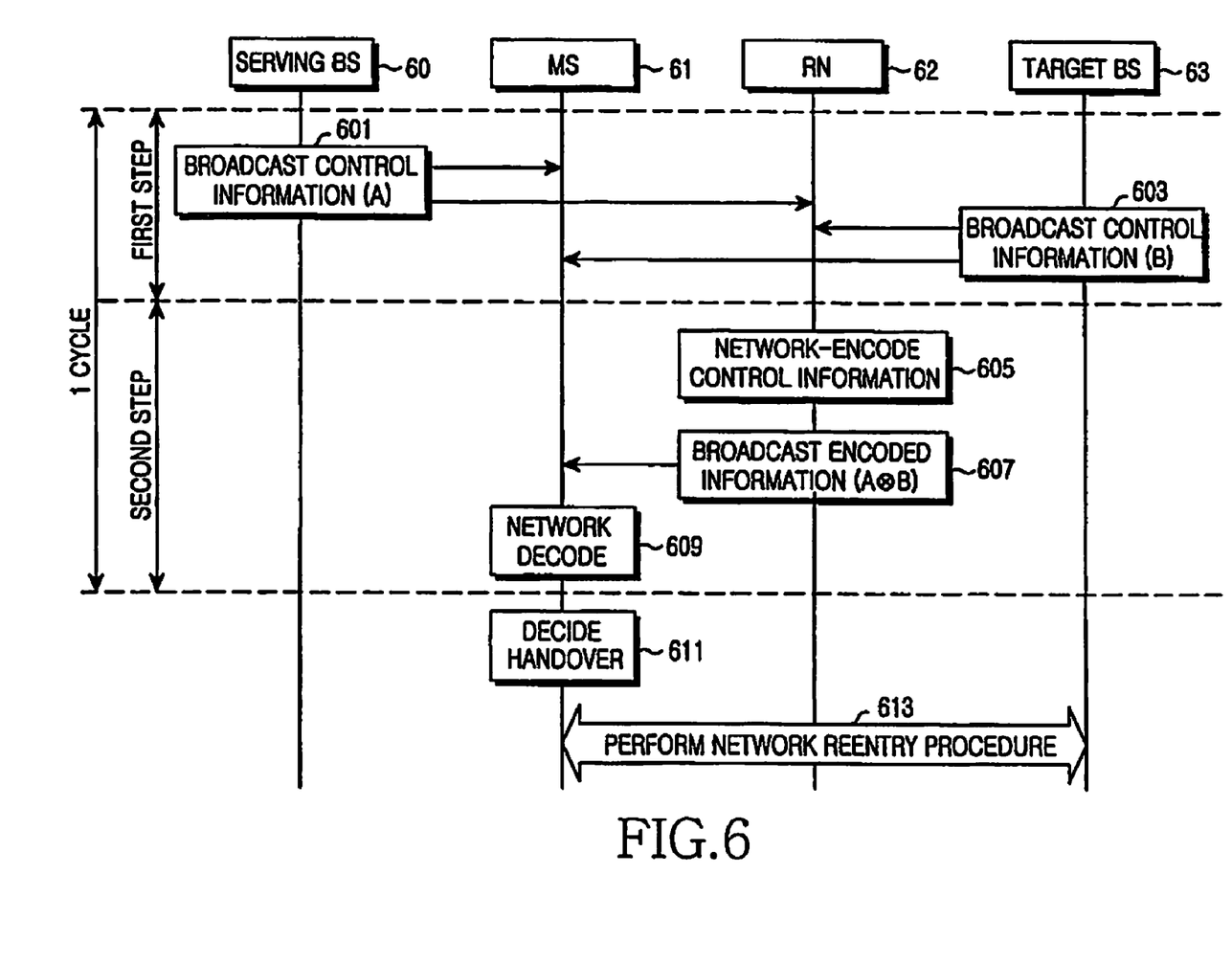
FIG. 6 is a diagram of a signal flow between a serving BS, the MS, the RN, and a target BS in the system according to the present invention.

FIG. 6 is a diagram of a signal flow between the serving BS, the MS, RN, and the target BS, in the system according to the present invention.

In FIG. 6, the serving BS 60 broadcasts control information A in step 601. MS and RN within the cell coverage area can receive the broadcast control information A. For example, if the MS 61 travels within the service coverage of the serving BS 60, it receives and stores the control information A. Hereafter, descriptions explain a case where the MS 61 moves out of the service coverage of the serving BS 60 and is handed over to the target BS 63.

Meanwhile, the target BS 63 broadcasts control information B over its service coverage in step 603. The MS 61 and the RN 62 can receive the broadcast control information B. Unlike the RN 62, since Line Of Sight (LOS) with the BS of the MS 61 on the cell edge is not ensured, the MS 61 cannot normally receive the broadcast control information. Thus, the RN 62 relays the broadcast control information.

Upon receiving the control information from the serving BS 60 and the target BS 63, the RN 62 network-encodes the received control informations A and B in step 605 and broadcasts the network-encoded information A⊗B in step 607.

The MS 61 acquires the control information B of the target BS 63 by decoding the network-encoded information received from the RN 62 using the pre-stored control information A of the serving BS 60 in step 609.

Next, the MS 61 finally decides to perform the handover in step 611 and performs the network reentry procedure with the target BS 63 using the acquired control information B in step 613. As such, since the information of the target BS 63 can be acquired in advance before the handover, the signaling procedure between the MS 61 and the target BS 63 can be reduced after the handover.

Figure 7:
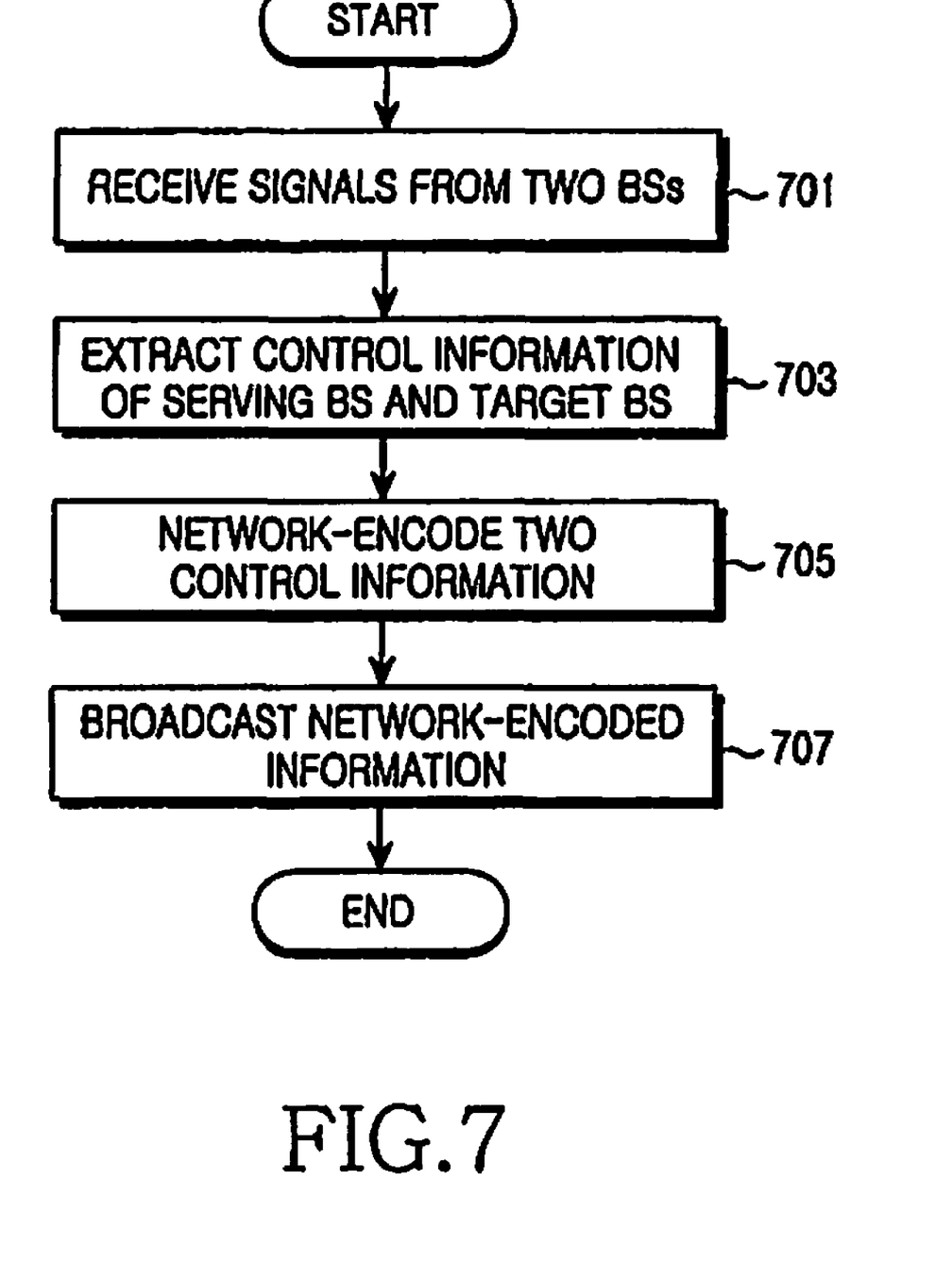
FIG. 7 is a flowchart of the RN operation in the cellular system according to the present invention.

FIG. 7 is a flowchart of the RN operation in the cellular system according to the present invention.

In FIG. 7, the RN receives signals from two neighbor BSs in step 701. Herein, it is assumed that the MS is handed over between the two BSs, and one BS is designated as the serving BS and the other BS is designated as the target BS.

Upon receiving the signals from the two BSs, the RN extracts control information A of the serving BS and control information B of the target BS from the received signals in step 703. Next, the RN network-encodes the extracted control information A and control information B in step 705, and broadcasts the network-encoded information over its service coverage in step 707.

Figure 8:
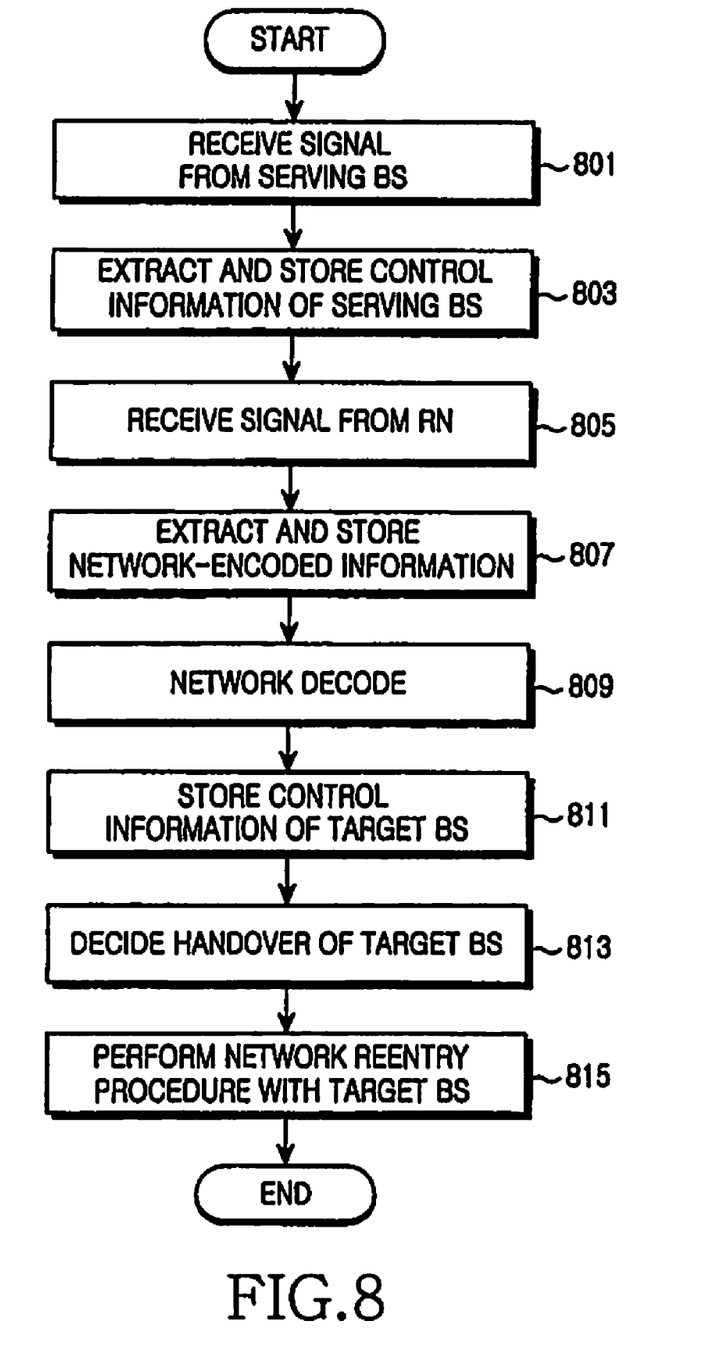
FIG. 8 is a flowchart of the MS operation in the cellular system according to the present invention.

FIG. 8 is a flowchart of the MS operation in the cellular system according to the present invention.

In FIG. 8, the MS receives a signal from a serving BS in step 801, extracts and stores control information A of the serving BS from the received signal in step 803. Herein, for example, the control information, which is broadcast by the BS, can be UCD/DCD information.

When the MS migrates from the service coverage of the serving BS to a target BS, it receives a signal broadcast from an RN in the cell overlapping area in step 805. Upon receiving the signal of the RN, the MS extracts and stores the network-encoded information A⊗B from the received signal of the RN in step 807.

Next, the MS acquires control information B of the target BS by decoding the network-encoded information using the pre-stored control information A of the serving BS in step 809, and stores the control information B of the target BS to the memory in step 811.

The MS finally decides to perform the handover to the target BS in step 813, and performs the network reentry procedure with the target BS using the control information B of the target BS in step 815.

Figure 9:
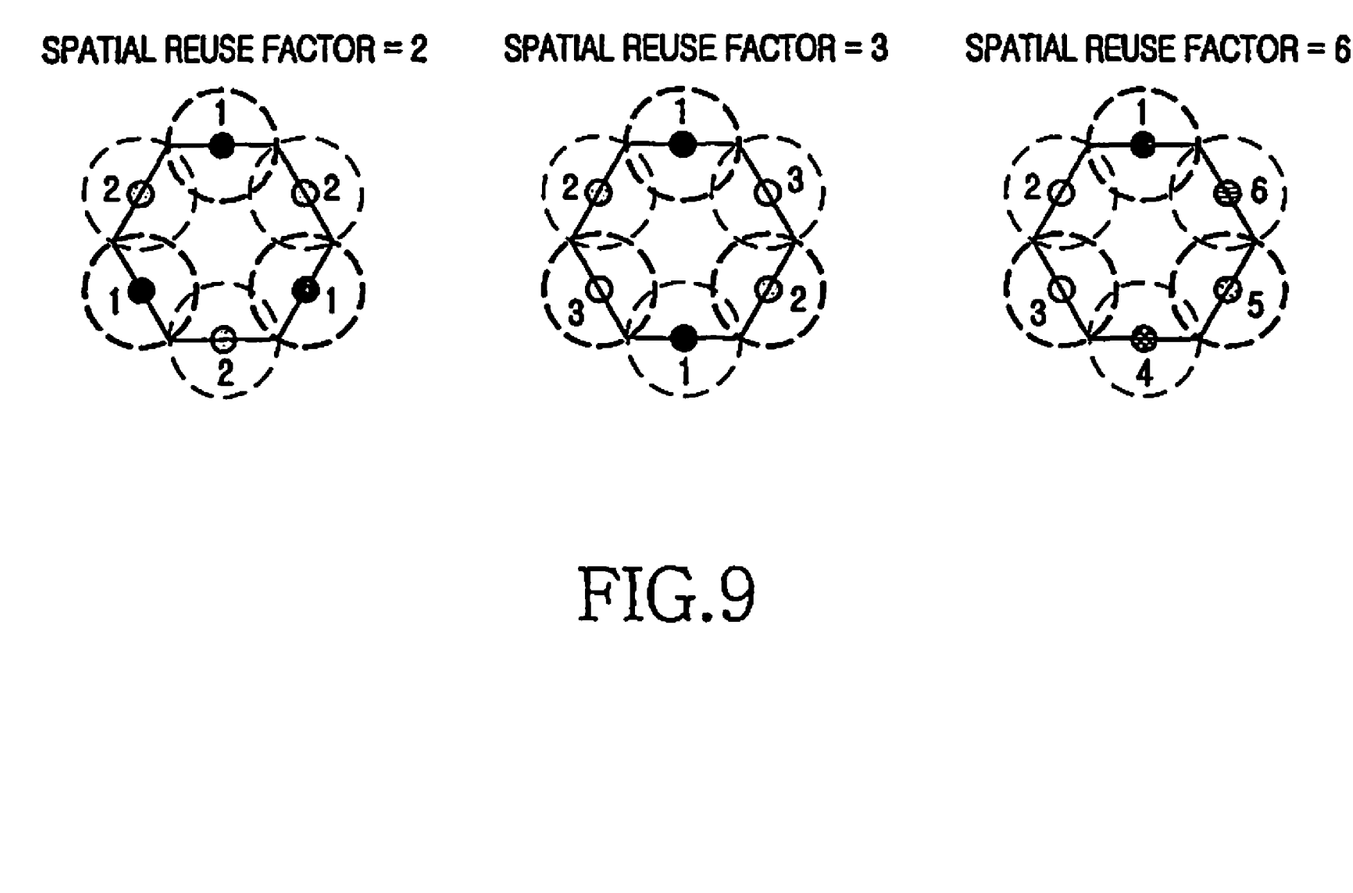
FIG. 9 is a diagram of the RN arrangement by applying spatial reuse in the cellular system according to the present invention.

FIG. 9 is a diagram of the RN arrangement by applying spatial reuse in the cellular system according to the present invention.

When the RN transmits the signal, the arrangement using the spatial reuse concept is needed to mitigate the co-channel interference. FIG. 9 shows the RN arrangement when the spatial reuse is 2, 3 and 6. The RN of the same number can transmit the signal over the same resource, and the neighbor RNs can transmit the signals over different resources. As the spatial reuse factor increases, the limited resource has to be allocated to a greater number of RNs. Yet, the interference between the RNs can be mitigated because the number of RNs sharing a specific resource decreases.

As set forth above, the information of two BSs can be seamlessly transferred to the handed-over MS via the RN. The signals can be transmitted over less radio resource by virtue of the network encoding scheme. Further, since the MS acquires the information of the target BS before the handover, the signaling procedure with the target BS can be minimized.

While the handover is illustrated by way of example, the RN can network-encode and broadcast other messages as well as the necessary message in the handover. The control information broadcast by the RN can be not only UCD/DCD information but also other control information (e.g., UL control region (CQI channel, ACK channel, etc.) resource allocation information). If the RN network-encodes and transmits the resource allocation information (MAP information) of the neighbor BSs, the MS may select a soft handover (or Fast Base Station Switching (FBSS)) target BS using the resource allocation status of the neighbor BSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Relay Node (RN) in a cellular system, comprising:
   a receiver for receiving broadcast control information of neighbor Base Stations (BSs);
   an encoder for network-encoding, using an exclusive OR (XOR) operation, the received broadcast control information, to efficiently use a radio resource; and
   a transmitter for broadcasting the network-encoded information.

2. The RN of claim 1, wherein the receiver comprises:
   a Radio Frequency (RF) receiver for converting an RF signal received on an antenna to a baseband signal;

an Orthogonal Frequency Division Multiplexing (OFDM) demodulator for generating frequency-domain data by OFDM-demodulating the signal fed from the RF receiver;

a demodulator for extracting data of the neighbor BSs from the frequency-domain data fed from the OFDM demodulator and demodulating the extracted data; and a decoder for restoring the broadcast control information of the neighbor BSs by decoding the data fed from the demodulator.

3. The RN of claim 1, wherein the transmitter comprises:
an encoder for encoding the network-encoded information;
a modulator for modulating the data fed from the encoder;
an OFDM modulator for generating time-domain data by OFDM-modulating the data fed from the modulator; and
an RF transmitter for converting the data fed from the OFDM modulator to an RF signal and transmitting the RF signal over an antenna.

4. The RN of claim 1, wherein the broadcast control information of the neighbor BSs is information required for a network reentry of a handed-over Mobile Station (MS).

5. The RN of claim 1, wherein the broadcast control information of the neighbor BSs is Uplink Channel Descriptor (UCD) and Downlink Channel Descriptor (DCD) information.

6. A Mobile Station (MS) in a cellular system comprising:
a storage for storing broadcast control information of a serving Base Station (BS);
a receiver for receiving network-encoded information, encoded using an exclusive OR (XOR) operation and broadcast by a Relay Node (RN), to efficiently use a radio resource; and
a decoder for acquiring broadcast control information of a neighbor BS by decoding the network-encoded information received at the receiver using the broadcast control information of the serving BS.

7. The MS of claim 6, wherein the receiver comprises:
a Radio Frequency (RF) receiver for converting an RF signal received on an antenna to a baseband signal;
an Orthogonal Frequency Division Multiplexing (OFDM) demodulator for generating frequency-domain data by OFDM-demodulating the signal fed from the RF receiver;
a demodulator for extracting data of the RN from the frequency-domain data fed from the OFDM demodulator and demodulating the extracted data; and
a decoder for restoring the network-encoded information by decoding the data fed from the demodulator.

8. The MS of claim 6, wherein the broadcast control information is information required for network reentry.

9. The MS of claim 6, wherein the broadcast control information is Uplink Channel Descriptor (UCD) and Downlink Channel Descriptor (DCD) information.

10. A handover apparatus in a cellular system, comprising:
a Relay Node (RN) for receiving broadcast control information of a serving Base Station (BS) and a neighbor BS, network-encoding using an exclusive OR (XOR) operation and broadcasting the received broadcast control information, to efficiently use a radio resource; and
a Mobile Station (MS) for storing the broadcast control information received from the serving BS and acquiring broadcast control information of the neighbor BS by decoding the network-encoded information received from the RN with the broadcast control information of the serving BS.

11. The handover apparatus of claim 10, wherein, when the MS is handed over to the neighbor BS, the MS performs a network reentry procedure using the control information of the neighbor BS.

12. The handover apparatus of claim 11, wherein the broadcast control information is information required for the network reentry.

13. The handover apparatus of claim 10, wherein the broadcast control information is Uplink Channel Descriptor (UCD) and Downlink Channel Descriptor (DCD) information.

14. A communication method of a Mobile Station (MS) in a cellular system, comprising:
receiving and storing broadcast control information from a serving Base Station (BS);
receiving network-encoded information, encoded using an exclusive OR (XOR) operation and broadcast by a Relay Node (RN), to efficiently use a radio resource, when the MS enters a cell overlapping area; and
acquiring broadcast control information of a neighbor BS by decoding the network-encoded information using the broadcast control information of the serving BS.

15. The communication method of claim 14, further comprising:
when the MS is handed over to the neighbor BS, performing a network reentry procedure using the acquired broadcast control information of the neighbor BS.

16. The communication method of claim 14, wherein the receiving step comprises:
converting a Radio Frequency (RF) signal received on an antenna to a baseband signal;
generating frequency-domain data by Orthogonal Frequency Division Multiplexing (OFDM)-demodulating the baseband signal;
extracting data of the RN from the frequency-domain data; and
restoring the network-encoded information by demodulating and decoding the extracted data.

17. The communication method of claim 15, wherein the broadcast control information is information required for the network reentry.

18. The communication method of claim 14, wherein the broadcast control information is at least one of Uplink Channel Descriptor (UCD) information, Downlink Channel Descriptor (DCD) information, and Mobile Application Part (MAP) information.

19. A handover method in a cellular system, comprising:
receiving, at a Relay Node (RN), broadcast control information of a serving Base Station (BS) and a neighbor BS;
network-encoding using an exclusive OR (XOR) operation and broadcasting, at the RN, the received broadcast control information, to efficiently use a radio resource;
receiving and storing, at a Mobile Station (MS), the broadcast control information of the serving BS;
receiving, at the MS, the network-encoded information from the RN when the MS enters a cell overlapping area; and acquiring, at the MS, the broadcast control information of the neighbor BS by decoding the received network-encoded information with the broadcast control information of the serving BS.

20. The handover method of claim 19, further comprising:
performing, at the MS, a network reentry procedure using the acquired broadcast control information of the neighbor BS when the MS is handed over to the neighbor BS.

21. The handover method of claim 19, further comprising:
selecting, at the MS, a handover target BS using the broadcast control information of the neighbor BS.

22. The handover method of claim 20, wherein the broadcast control information is information required for the network reentry.

23. The handover method of claim 19, wherein the broadcast control information is at least one of Uplink Channel Descriptor (UCD) information, Downlink Channel Descriptor (DCD) information, and Mobile Application Part (MAP) information.

* * * * *